(12) United States Patent
Hinata et al.

(10) Patent No.: US 8,223,652 B2
(45) Date of Patent: *Jul. 17, 2012

(54) STORAGE SYSTEM, PATH MANAGEMENT METHOD AND PATH MANAGEMENT DEVICE

(75) Inventors: Sachiko Hinata, Odawara (JP); Dai Taninaka, Odawara (JP); Misako Tamura, Mishima (JP)

(73) Assignee: Hitachi, Ltd., Tokyo (JP)

( * ) Notice: Subject to any disclaimer, the term of this patent is extended or adjusted under 35 U.S.C. 154(b) by 342 days.

This patent is subject to a terminal disclaimer.

(21) Appl. No.: 12/696,531

(22) Filed: Jan. 29, 2010

(65) Prior Publication Data

US 2010/0198987 A1    Aug. 5, 2010

Related U.S. Application Data

(63) Continuation of application No. 11/472,403, filed on Jun. 22, 2006, now Pat. No. 7,656,806.

(30) Foreign Application Priority Data

Apr. 20, 2006   (JP) .................................. 2006-116358

(51) Int. Cl.
    *G01R 31/08*    (2006.01)
(52) U.S. Cl. .......................... 370/238; 370/252; 370/389
(58) Field of Classification Search .................. 709/242, 709/238
    See application file for complete search history.

(56) References Cited

U.S. PATENT DOCUMENTS

| 6,145,028 A | 11/2000 | Shank et al. |
| 2002/0143999 A1 | 10/2002 | Yamagami |
| 2003/0093619 A1 | 5/2003 | Sugino et al. |
| 2003/0135609 A1* | 7/2003 | Carlson et al. ................. 709/224 |
| 2004/0076154 A1 | 4/2004 | Mizutani et al. |
| 2004/0078632 A1 | 4/2004 | Infante et al. |
| 2007/0217419 A1* | 9/2007 | Vasseur ......................... 370/392 |

FOREIGN PATENT DOCUMENTS

| CN | 1490979 | 4/2004 |
| JP | 11-296313 A | 10/1999 |
| JP | 2003-32290 | 1/2003 |
| JP | 2003-216348 | 7/2003 |
| JP | 2006-040026 A | 2/2006 |

OTHER PUBLICATIONS

Extended Search Report in EP 06255648, dated Sep. 2, 2009 (7 pages).
Office Action in Japanese Patent Appln. 2006-116358, mailed Feb. 14, 2012, (in Japanese, 4 pgs).

* cited by examiner

*Primary Examiner* — Pao Sinkantarakorn
*Assistant Examiner* — Iqbal Zaidi
(74) *Attorney, Agent, or Firm* — Antonelli, Terry, Stout & Kraus, LLP.

(57) ABSTRACT

Proposed are a storage system, a path management method and a path management device capable of ensuring the processing performance demanded by a user while seeking to improve the access performance from a host system to a storage apparatus. Path switching control for dynamically switching the path to be used by the host system according to the loaded condition of the respective paths between the host system and the storage apparatus is executed; and a path is selected as needed according to a policy containing path switching rules created by a user, and path switching control for excluding the selected path from the target and dynamically switching the path to be used by the host system is executed.

6 Claims, 15 Drawing Sheets

FIG.3

| # | EXTRACTED ITEM | EXTRACTED INFORMATION | EXTRACTION SOURCE |
|---|---|---|---|
| 1 | IO RESPONSE TIME OF EACH PATH | TAKE STATISTICS WITH MANAGEMENT SERVER AND DECIDE PRIORITY OF PATH TO BE SWITCHED (USED) | HOST SYSTEM |
| 2 | TRANSFER RATE OF PATH | " | " |
| 3 | IOPS OF EACH HBA | " | " |
| 4 | QUEUE COUNT OF HOST | " | " |
| 5 | PATH UTILIZATION RATIO | " | " |
| 6 | MP AVAILABILITY FACTOR | " | MANAGEMENT TERMINAL |
| 7 | MP LOAD FACTOR | " | " |
| 8 | VOLUME LOAD FACTOR | " | " |
| 9 | RAID Gp LOAD FACTOR | " | " |
| 10 | DKC SERIAL NUMBER OR WWN | SEND [DKC SERIAL NUMBER OR WWN] TO MANAGEMENT SERVER EVEN DURING FAILURE. USE [DKC SERIAL NUMBER OR WWN] FOR IDENTIFYING PATH | " |

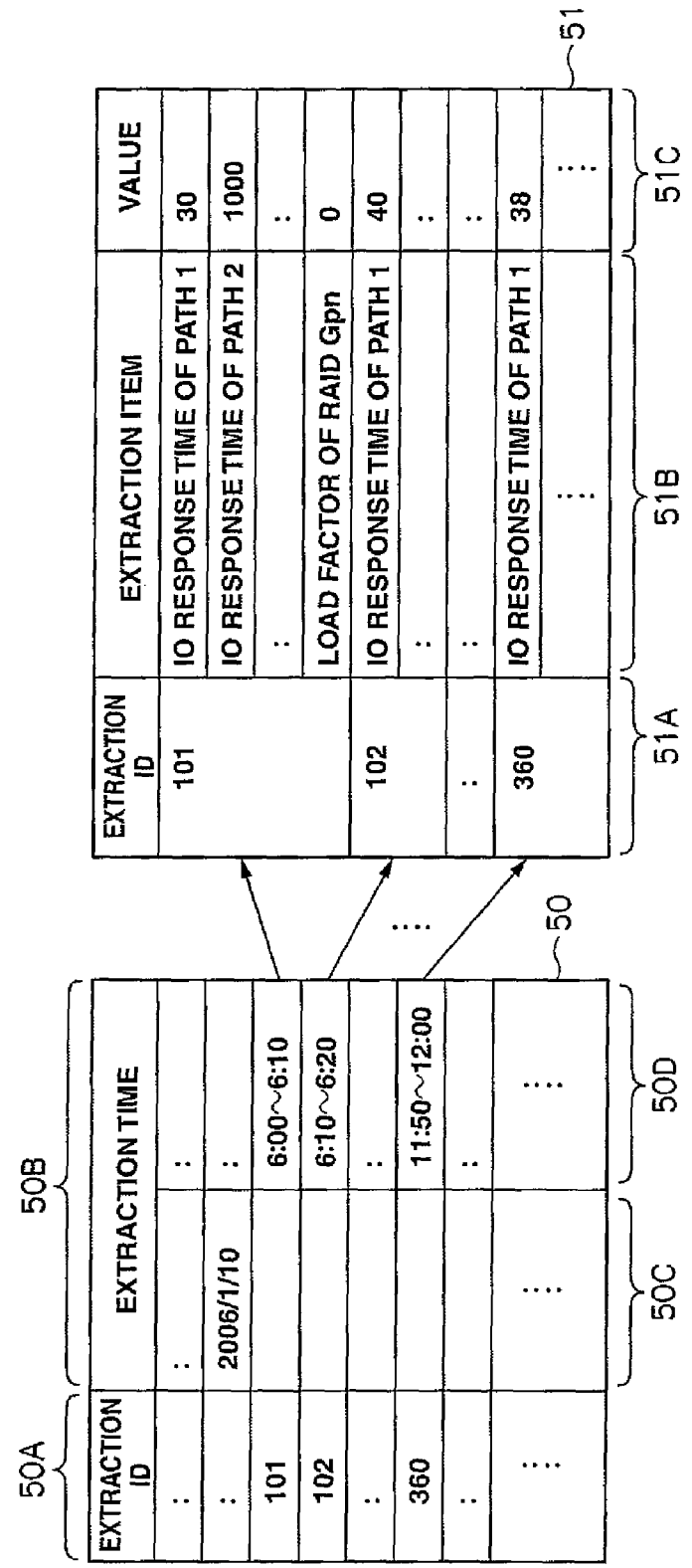

FIG.5

| POLICY ID | CONTROL TIME | PATH | HBA | PORT# | ... | APPLICATION |
|---|---|---|---|---|---|---|
| 1 | 6:00~12:00 | 2 | 1 | | | ○ |
| 2 | 18:00~0:00 | 1 | 2 | | | |
| | | | | | | |
| | | | | | | |
| | | | | | | |
| | | | | | | |

[APPLY] [DISPLAY STATISTICS INFORMATION] [CREATE/CHANGE] [DELETE]

SAMPLING TIME SETTING

SAMPLING TIME (0:00~24:00)

66A ─ □:□ ~ □:□ ─ 66B

[OK] [CANCEL]

LOAD STATISTICS INFORMATION

LOADED CONDITION IN SAMPLING TIME

| PATH 6:00~ 12:00 | PATH NECK FACTOR ||||||| DRIVE NECK INFORMATION |||
|---|---|---|---|---|---|---|---|---|---|---|
| | RESPONSE TIME | TRANSFER RATE | IOPS OF HBA | QUEUE COUNT | PATH UTILIZATION RATIO | MP AVAILABILITY FACTOR | OVERLOAD LEVEL | VOLUME LOAD | RAID Gp LOAD | OVERLOAD LEVEL |
| 1 | 100 | 100 | 2000 | 4 | 10 | 10 | 0 | 5 | 10 | 0 |
| 2 | 400 | 80 | 3000 | 8 | 40 | 20 | 4 | 10 | 20 | 0 |
| .. | .. | .. | .. | .. | .. | .. | .. | .. | .. | .. |
| THRESHOLD VALUE | 300 | 200 | 3000 | 6 | 30 | 30 | - | 30 | 30 | - |

| PATH | HBA ID | PORT ID | MP ID | LDEV ID | RAIDGr ID |
|------|--------|---------|-------|---------|-----------|
| 1 | 1 | 1 | 1 | 1 | 1 |
| 2 |   | 2 | 2 | 1 | 1 |
| 3 | 2 | 3 | 1 | 2 | 1 |
| 4 |   | 4 | 2 | 2 | 1 |

| PATH 6:00~12:00 | PATH NECK FACTOR ||||||| DRIVE NECK INFORMATION |||
|---|---|---|---|---|---|---|---|---|---|---|
| | RESPONSE TIME | TRANSFER RATE | IOPS OF HBA | QUEUE COUNT | PATH UTILIZATION RATIO | MP AVAILABILITY FACTOR | OVERLOAD LEVEL | VOLUME LOAD | RAID Gp LOAD | OVERLOAD LEVEL |
| 1 | 100 | 100 | 2000 | 4 | 10 | 10 | 0 | 5 | 10 | 0 |
| 2 | 400 | 80 | 3000 | 8 | 40 | 20 | 4 | 10 | 20 | 0 |
| .. | .. | .. | .. | .. | .. | .. | .. | .. | .. | .. |
| THRESHOLD VALUE | 300 | 200 | 3000 | 6 | 30 | 30 | - | 30 | 30 | - |
| | 100BA | 100BB | 100BC | 100BD | 100BE | 100BF | 100BG | 100CA | 100CB | 100CC |

100A | 100B | 100C | 100

STORAGE SYSTEM, PATH MANAGEMENT METHOD AND PATH MANAGEMENT DEVICE

CROSS-REFERENCES TO RELATED APPLICATIONS

This application is a continuation of U.S. application Ser. No. 11/472,403, filed Jun. 22, 2006 now U.S. Pat. No. 7,656, 806. This application relates to and claims priority from Japanese Patent Application No. 2006-116358, filed on Apr. 20, 2006, the entire disclosure of which is incorporated herein by reference.

BACKGROUND OF INVENTION

1. Field of Invention

The present invention relates to a storage system, a path management method and a path management device, and can be suitably employed in a storage system equipped with a path management function for switching the path between a host system and a storage apparatus so as to balance the load of the respective paths.

2. Background Art

In recent years, a storage system is often configured so that a single storage apparatus performs multiple processes to a plurality of host systems pursuant to the enlargement of the SAN (Storage Area Network) environment and increased capacity of storage apparatuses.

Under this kind of environment, a conventional storage system has a complicated path for connecting the host system and the storage apparatus, and various systems have been proposed to date as the path management system for managing such complicated path (e.g., refer to Japanese Patent Laid-Open Publication No. 2003-32290).

SUMMARY OF INVENTION

Meanwhile, many of the path management systems adopted in the storage system today employ a method of equalizing the load of each path by balancing the load with the overall SAN. According to this kind of path management method, there is an advantage in that it is possible to prevent problems such as the concentration of the load on a specific path from happening, and the access performance from the host system to the storage apparatus can be improved in the overall storage system.

Nevertheless, with the foregoing path management system that equalizes the load of each path, there are cases where it is not possible to secure the processing performance demanded by a user since no consideration is given to the importance of processing.

Further, with this path management system, since the path is switched from the load checking state, there is a problem in that the path will be frequently switched during processing where the fluctuation of the load is severe, and overhead will arise in the host system.

The present invention was made in view of the foregoing problems. Thus, an object of the present invention is to propose a storage system, a path management method and a path management device capable of ensuring the processing performance demanded by a user while seeking to improve the access performance from a host system to a storage apparatus.

In order to achieve the foregoing object, the present invention provides a storage system in which a host system as a higher-level device and a storage apparatus providing a volume to the host system for reading and writing data are connected via a plurality of paths. This storage system comprises a path switching unit provided to the host system and which executes path switching control for dynamically switching the path to be used by the host system according to the loaded condition of the respective paths between the host system and the storage apparatus, and a management unit for selecting a path according to a policy containing path switching rules created by a user as needed, and controlling the path switching unit so as to exclude the selected path from the target of the path switching control for dynamically switching the path to be used by the host system.

Accordingly, with this storage system, it is possible to ensure the processing performance demanded by a user as a result of selecting a path according to a policy created by the user as needed and excluding the selected path from the target of the path switching control while seeking to improve the access performance from the host system to the storage apparatus based on the path switching control for dynamically switching the path to be used by the host system according to the loaded condition of the respective paths between the host system and the storage apparatus.

Further, the present invention provides a path management method in a storage system in which a host system as a higher-level device and a storage apparatus providing a volume to the host system for reading and writing data are connected via a plurality of paths. This path management method comprises the steps of executing path switching control for dynamically switching the path to be used by the host system according to the loaded condition of the respective paths between the host system and the storage apparatus, and selecting a path according to a policy containing path switching rules created by a user as needed, and executing path switching control for excluding the selected path from the target and dynamically switching the path to be used by the host system.

Accordingly, with this path management method, it is possible to ensure the processing performance demanded by a user as a result of selecting a path according to a policy created by the user as needed and excluding the selected path from the target of the path switching control while seeking to improve the access performance from the host system to the storage apparatus based on the path switching control for dynamically switching the path to be used by the host system according to the loaded condition of the respective paths between the host system and the storage apparatus.

In addition, the present invention provides a path management device for managing the respective paths between a host system and a storage apparatus in a storage system in which the host system as a higher-level device and the storage apparatus providing a volume to the host system for reading and writing data are connected via a plurality of paths, and the host system executes path switching control for dynamically switching the path to be used by the host system according to the loaded condition of the respective paths between the host system and the storage apparatus. This path management device comprises a management unit for selecting a path according to a policy containing path switching rules created by a user as needed, and controlling the path switching unit so as to exclude the selected path from the target of the path switching control for dynamically switching the path to be used by the host system.

Accordingly, with this path management device, it is possible to ensure the processing performance demanded by a user as a result of selecting a path according to a policy created by the user as needed and excluding the selected path from the target of the path switching control while seeking to improve the access performance from the host system to the storage apparatus based on the path switching control for dynamically switching the path to be used by the host system according to the loaded condition of the respective paths between the host system and the storage apparatus.

According to the present invention, it is possible to manage the path while giving consideration to the importance of processing. Accordingly, it is possible to realize a storage system, a path management method and a path management device capable of ensuring the processing performance demanded by a user while seeking to improve the access performance from a host system to a storage apparatus.

BRIEF DESCRIPTION OF DRAWINGS

FIG. 3 is a chart explaining the load information extraction processing;

FIG. 4 is a conceptual diagram explaining the time-series load table and the statistical table;

FIG. 5 is a schematic diagram showing the setting policy display screen;

FIG. 6 is a schematic diagram showing the sampling time setting screen;

FIG. 7 is a schematic diagram showing the load statistics information display screen;

FIG. 14 is a conceptual diagram explaining the path information table;

FIG. 16 is a conceptual diagram explaining the display statistics information table;

DETAILED DESCRIPTION OF PREFERRED EMBODIMENTS

An embodiment of the present invention is now explained with reference to the attached drawings.

(1) Configuration of Storage System in Present Embodiment

Figure 1:
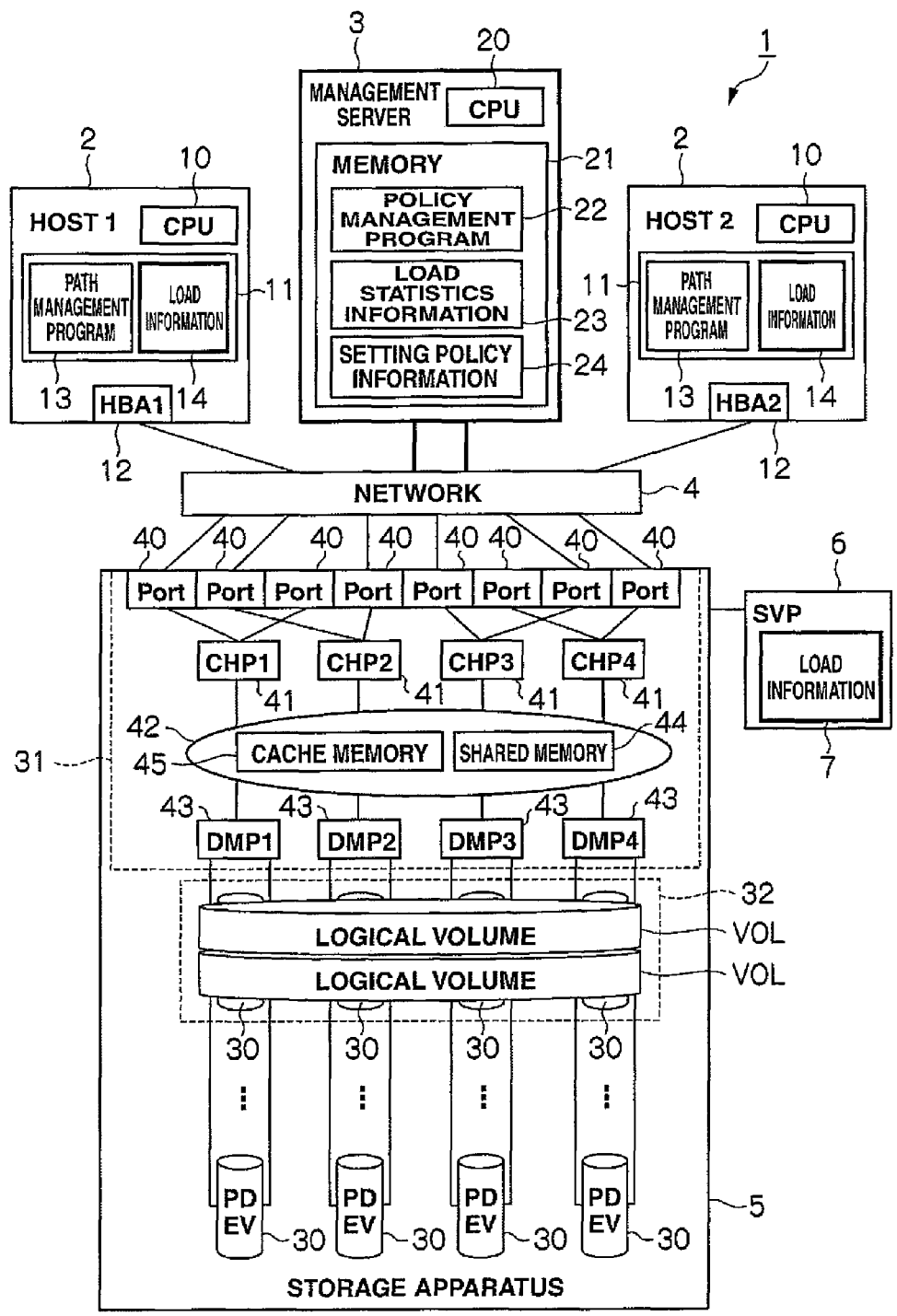
FIG. 1 is a block diagram showing the overall configuration of the storage system according to an embodiment of the present invention.

FIG. 1 shows the overall storage system 1 according to the present embodiment. Referring to FIG. 1, the storage system 1 comprises a plurality of host systems 2 and a management server 3 connected to a storage apparatus 5 via a network 4, and a management terminal 6 connected to the storage apparatus 5.

The host system 2 is a computer device including a CPU (Central Processing Unit) 10, a memory 11, a host bus adapter (HBA: Host Bus Adapter) 12 and the like, and, for instance, is configured from a personal computer workstation, mainframe or the like. The CPU 10 executes various control processing based on various control programs stored in the memory 11. The memory 11 is used for retaining various types of control programs and various types of information, and is also used as a work memory of the CPU 10. The path management program 13 and load information 14 described later are also retained in the memory 11. The host bus adapter 12, for example, is configured from a SCSI (Small Computer System Interface) card and functions as an interface.

The management server 3, as with the host system 2, is a computer device comprising information processing resources such as a CPU 20 and a memory 21, and is configured from a personal computer, workstation, mainframe or the like. The CPU 20 executes various control processing based on various control programs stored in the memory 21. The memory 21 is used for retaining various types of control programs and various types of information, and is also used as a work memory of the CPU 20. The policy management program 22, load statistics information 23 and setting policy information 24 described later are also retained in the memory 21.

The network 4, for example, is configured from a SAN, LAN (Local Area Network), the Internet, public line, or dedicated line. Communication between the host system 2, the management server 3 and the storage apparatus 5 via the network 4 is conducted according to a fibre channel protocol when the network 4 is a SAN, and conducted according to a TCP/IP (Transmission Control Protocol/Internet Protocol) protocol when the network 4 is a LAN.

The storage apparatus 5 comprises a plurality of storage devices 30 and a controller 31 for controlling the storage devices 30.

The storage device 30, for instance, is configured from an expensive disk drive such as an FC (Fibre Channel) disk, or an inexpensive disk drive such as a SATA (Serial AT Attachment) disk or optical disk drive, or a semiconductor memory. A single RAID (Redundant Array of Inexpensive Disks) group 32 is configured from a prescribed number (four, for instance) of storage devices 30, and one or more logical volumes (hereinafter referred to as "logical volumes") VOL are defined in a storage extent provided by the respective storage devices 30 configuring a single RAID group 32. Data from the host system 2 is read from and written into these logical volumes VOL in block units of a prescribed size.

Each logical volume VOL is assigned a unique identifier (LUN: Logical Unit Number). In the present embodiment, an identifier and a unique number (LBA: Logical Block Address) allocated to each block are set as the address, and the input and output of user data is conducted by designating such address.

The controller 31 comprises a plurality of ports 40, a plurality of channel processors 41, a connection 42 and a plurality of disk management processors 43.

A network address (for example, IP address or WWN) is allocated to each port 40 for identifying the respective ports 40, and, as a result, the host system 2 and the management server 3 are able to access the desired port 40 by designating the network address.

Each channel processor 41 is configured as a microcomputer system comprising a microprocessor, memory and so on, and is switchably connected to the port corresponding to the respective channel processors. The channel processors 41 interpret the various commands sent from the host system 2 and perform necessary processing to execute such commands.

The connection 42 comprises a shared memory 44 and a cache memory 45, and is connected to the channel processors 41 and the disk management processors 43. The sending and receiving of data and commands among the channel processor 41, the disk management processor 43, the shared memory 44, and the cache memory 45 are conducted via the connection 42. The connection 42, for example, is configured from a switch such as an ultra fast crossbar switch that transfers data by high-speed switching or a bus.

The shared memory 44 is a memory to be shared by the channel processors 41 and the disk management processors 43. The shared memory 44 is primarily used for storing micro programs and configuration information read from the system volume when a prescribed disk device 30 is turned on, or commands from the host system 2.

The cache memory 45 is also a memory to be shared by the channel processors 41 and the disk management processors 43. The cache memory 45 is primarily used for temporarily storing data to be input to and output from the storage apparatus 5.

Each disk management processor 43 is configured as a microcomputer system having a microprocessor, memory and the like, and functions as an interface for controlling the protocol during communication with each storage device 30. The disk management processors 43, for instance, are connected to mutually different storage devices 30 among the respective storage devices 30 configuring the same RAID group 32 via a fibre channel cable, and send and receive data to and from the storage device 30 according to a communication protocol corresponding to such fibre channel protocol.

The management terminal 6, as with the host system 2, is a computer device including information processing resources such as a CPU and memory. The management terminal 6, for instance, is configured from a personal computer, workstation, or portable information terminal. The management terminal 6 has a display device for displaying GUI (Graphical User Interface) used to perform various settings in the storage apparatus 5 as well as various types of information, and an input device such as a keyboard or mouse for the system administrator to perform various operations or input various settings. The management terminal 6 performs various processing based on various commands input via the input device.

(2) Path Management Function in Storage System (2-1) Outline of Path Management Function in Storage System The path management function loaded in the storage system 1 according to the present embodiment is now explained.

With the storage system 1, the CPU 10 of the host system 2 performs path switching control processing for dynamically switching the path to be used by the host system 2 up to the corresponding logical volume in the storage apparatus 5 based on the path management program 13 so as to balance the load of the respective paths (this is hereinafter referred to as "load balancing path switching control processing"). In addition, the CPU 10 of the host system 2 performs path switching control processing based on path switching rules (this is hereinafter referred to as a "policy") created by a user under the control of the management server 3 (this is hereinafter referred to as "policy path switching control processing").

Figure 2:
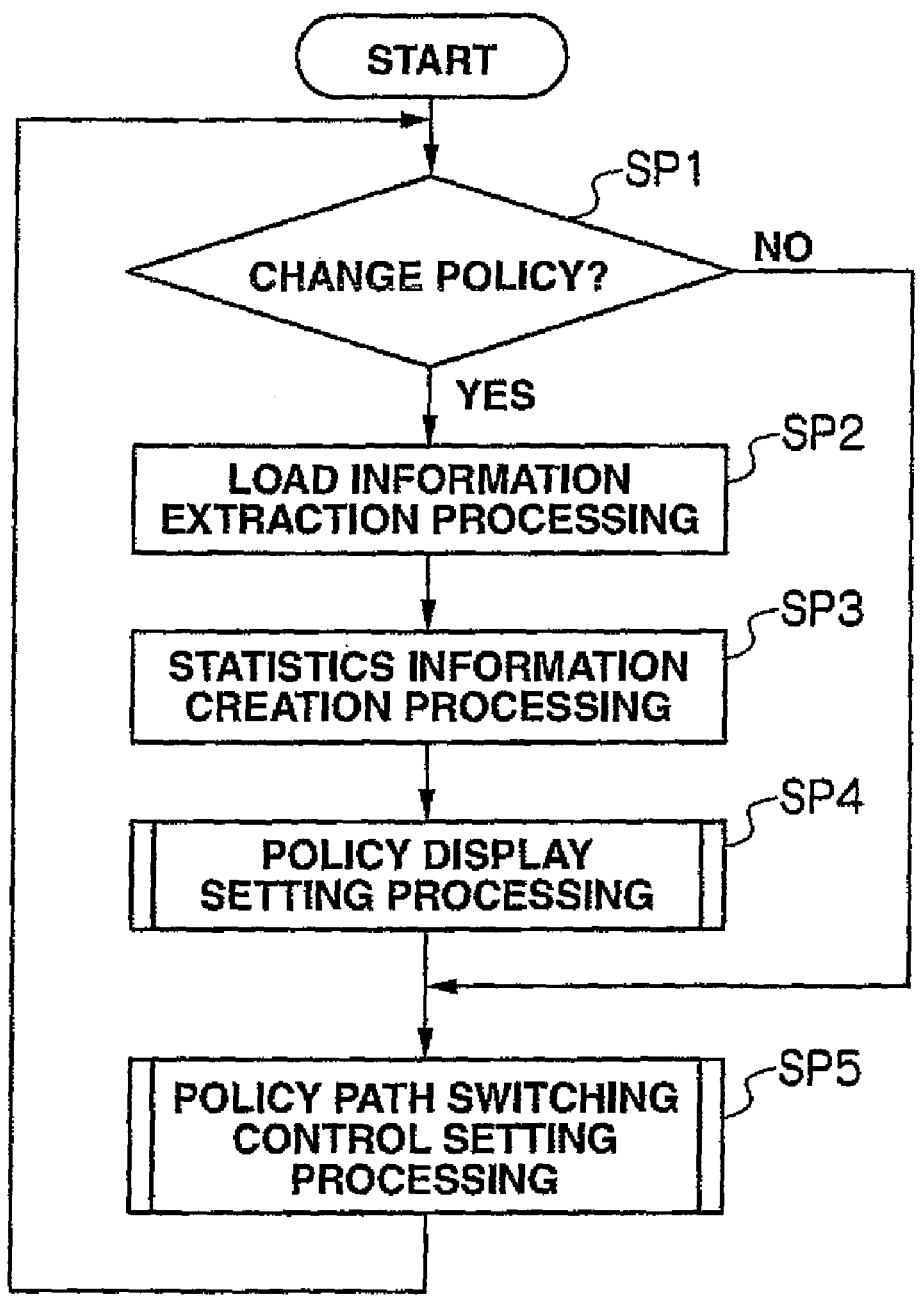
FIG. 2 is a flowchart showing the processing routine of policy path switching control processing.

FIG. 2 is a flowchart representing the outline of the series of processes to be performed by the CPU 20 in the management server 3 in relation to the policy path switching control processing among the path management functions in the storage system 1 (this is hereafter referred to as "policy path management processing"). The CPU 20 executes the policy path management processing shown in FIG. 2 based on the policy management program 24 stored in the memory 21.

In other words, when the policy management program 24 is activated, the CPU 20 starts this policy path management processing, and foremost determines whether an operation for changing the policy setting has been performed (SP1). Here, "changing of policy setting" refers to the changing of the contents of the policy that has been set, deletion of such policy, or creation of a new policy.

When the CPU 20 obtains a negative result in this determination, it proceeds to step SP5. Contrarily, when the CPU 20 obtains a positive result, it extracts information representing the loaded condition of the respective paths such as the data transfer rate and path utilization ratio (such information is hereinafter collectively referred to as "load information") from the host system 2 and the management terminal 6 (SP2).

Subsequently, the CPU 20 calculates the average value per prescribed unit time for each item of load information such as the data transfer rate (such items are hereinafter collectively referred to as the "load items") per path based on the extracted load information of the respective paths, and retains the calculated result as load statistics information 23 (FIG. 1) in the memory 21 (SP3).

The CPU 20 thereafter visually displays the load statistics information retained in the memory 21 on the display of the management server 3 so that it will become a rough standard upon the user changing the policy setting, and changes the policy setting according to the operation of the user as a system administrator (SP4).

Subsequently, the CPU 20 controls the corresponding host system 2 for performing the path switching control according to the setting of a new policy set as described above (SP5), and thereafter repeats these processing steps (SP1 to SP5).

(2-2) Load Information Extraction Processing (SP2)

At step SP2 of the policy path management processing described with reference to FIG. 2, the CPU 20, as shown in FIG. 3, extracts from the respective host systems 2, as load information of each path, information such as a response time as the time required in responding to the data I/O request of each path ("IO response time of each path"), a data transfer rate of each path ("transfer rate of path"), a data I/0 count per second in each host bus adapter 12 of the host system 2 ("IOPS of each HBA"), a queue count during the queue processing performed in the host system 2 ("queue count of host"), and a utilization ratio per path ("path utilization ratio").

The CPU 20 also extracts from the management terminal 6, as load information of each path, information such as an availability factor of the microprocessor in the respective channel processors 41 and the respective disk management processors 43 of the storage apparatus 5 ("MP availability factor"), a load factor of such microprocessor calculated from the ratio of time used in performing some kind of processing in the operating time ("MP load information"), a load factor calculated from the processing queue to the respective logical volumes VOL existing in the storage apparatus 5 ("volume load factor"), a load factor of each RAID group 32 calculated as above ("RAID group load"), and a serial number of the storage apparatus 5 or WWN given to the storage apparatus 5 ("DKC serial number or WWN").

In the foregoing case, information of the respective load items to be extracted by the CPU 20 of the management server 3 from the host system 2 and the management terminal 6 is not information to be newly collected by the host system 2 and the management terminal 6, and, for instance, is a part of the information that has been respectively retained as load information 14, 7 with existing technology based on the path management program 13 in the case of the host system 2, and based on the management program (not shown) for managing the storage apparatus 5 mounted on the management terminal 6 in the case of such management terminal 6.

(2-3) Statistics Information Creation Processing (SP3)

Meanwhile, when the CPU 20 of the management server 3 extracts the foregoing load information from the host system 2 and the management terminal 6 as described above, it calculates the average value per prescribed unit time (10 minutes for instance) of each load item based on the extracted load information, and creates a time-series load table 50 as shown in FIG. 4A based on the calculated result.

The time-series load table 50 is a table for managing the average value per unit time of each calculated load item, and, as evident from FIG. 4A, it is configured from an "extracted ID" field 50A and an "extraction time" field 50B.

The "extracted ID" field 50A stores the corresponding extracted ID. The extracted ID is an ID of the corresponding entry among the identification numbers ("101", "102". . . ) given to the respective time frames obtained by sequentially classifying the time range of the load information extracted at step SP2 of the policy path management processing explained with reference to FIG. 2 into a time frame for each unit time.

The "extraction time" field 50B is configured from an "extraction date" field 50C and a "statistics" field 50D. The "extraction date" field 50C stores the year, month and day in which the host system 2 or the management terminal 6 acquired the load information, and the "statistics" field 50D stores the average value of each unit time calculated based on the load information extracted from the host system 2 or the management terminal 6.

When the CPU 20 finishes creating the time-series load table 50, it creates a statistical table 51 as shown in FIG. 4B based on the time-series load table 50.

The statistical table 51 is a table for organizing and managing the average value per unit time calculated regarding the respective load items extracted from the host system 2 or the management terminal 6, and, as evident from FIG. 4B, is configured from an "extracted ID" field 51A, an "extracted item" field 51B, and a "statistics" field 51C.

The "extracted item" field 51B stores the name of the load item (for instance, "IO response time of path 1", IO response time of path 2, and so on) as the target of the load information at such time, and the "average value" field 51C stores the average value per unit time of the load item read from the corresponding "statistics" field 50D in the time-series load table 50. The "extracted ID" field 51A stores the corresponding extracted ID in the time-series load table 50.

Accordingly, in the example of FIG. 4B, the entry in which the extracted ID is "101" in the time-series load table 50 can be recognized as the load information from "6:00" to "6:10" of "Jan. 10, 2006" upon referring to the time-series load table 50, and it is possible to further recognize that the response time of path 1 during that time was "30", and the response time of path 2 during that time was "1000" from the statistical table 51.

The CPU 20 thereafter manages the created time-series load table 50 and the statistical table 51 as load statistics information 23 (FIG. 1) by storing them in the memory 21 of the management server 3.

(2-4) Policy Display Setting Processing (SP4)
(2-4-1) Configuration of Various Display Screens Meanwhile, at step SP4 of the policy path management processing explained with reference to FIG. 2, the CPU 20 displays the various display screens shown in FIG. 5 to FIG. 10 on the display of the management server 3 according to the user's operation. The user will thereby be able to use these display screens to confirm the contents of the currently set policy or the statistical loaded condition of each path to become the rough standard upon changing the policy, or actually updating the policy setting.

In the case of this storage system 1, the user is able to display a setting policy display screen 60 as shown in FIG. 5 on the display of the management server 3 by operating the management server 3.

The setting policy display screen 60 is a screen displaying in a table format the specific contents of each of the current set policies, and, in relation to the policies, indicates information such as a registration ID ("policy ID"), applicable time of such policy ("control time"), ID of applicable path of such policy ("path"), a host path adapter ID of the host path adapter of the host system 2 through which the path passes through ("host bus adapter"), a port ID of the port 40 in the storage apparatus 5 through which the path passes through ("port #"), and application/nonapplication of the policy ("application").

The setting policy display screen 60 is provided with an apply button 61, a statistics information display button 62, a policy creation/change button 63, and a policy delete button 64 at the lower part of the screen.

By selecting one policy among the policies displayed on the setting policy display screen 60 and thereafter clicking the apply button 61, the user is able to change the application setting of the policy from nonapplicable to applicable or from applicable to nonapplicable.

In addition, by clicking the statistics information display button 62 of the setting policy display screen 60, the user is able to display a sampling time setting screen 65 as shown in FIG. 6 on the display of the management server 3.

The sampling time setting screen 65 is a screen for setting the time range for taking statistics (sampling time) upon displaying the load statistics information display screen 70 (FIG. 7) described later. The sampling time setting screen 65 can be used to input the start time and finish time of such sampling time, and the start time and finish time input above are respectively displayed on the setting start time display unit 66A and the setting finish time display unit 66B.

The sampling time setting screen 65 is provided with an OK button 67 and a cancel button 68 at the lower part of the screen. By clicking the OK button 67, the user is able to display a load statistics information display screen 70 as shown in FIG. 7 on the display of the management server 3, and, by clicking the cancel button 68, the user is able to return to the setting policy display screen 60 (FIG. 5).

The load statistics information display screen 70 is a screen displaying in a table format the statistics of certain load items regarding the respective paths that can be set from the respective host systems 2 existing in the storage system 1 to the respective logical volumes VOL in the storage apparatus 5.

The load statistics information display screen 70 indicates, with respect to all settable paths, statistics regarding the response time of the path within the range of the sampling time set with the sampling time setting screen 65 ("response time"), a data transfer rate ("transfer rate"), a data I/O processing count per second of the host bus adapter 12 in the host system through which the path passes through ("TOPS of HBA"), number of queues upon the corresponding host system 2 performing queue processing ("queue count"), utilization ratio of the path ("path utilization ratio"), availability factor of processors in the channel processors 41 and the disk management processors 43 of the storage apparatus 5 through which the path passes through ("MP availability factor"), load factor of the logical volume VOL connected to the path ("volume load factor"), and load factor of the RAID group 32 mapped with the logical volume VOL ("RAID Gp").

The load statistics information display screen 70 also respectively displays the threshold value (row of "threshold value") preset by the user regarding the response time, the data transfer rate, the data I/O processing count per second of the host bus adapter 12, the queue count, the path utilization ratio, the availability factor of the microprocessor, the load factor of the logical volume VOL, and the load factor of the RAID group 32.

Further, among the respective load items of response time, data transfer rate, data I/O processing count per second of the host bus adapter 12, queue count, path utilization ratio, and availability factor of the microprocessor, the load statistics information display screen 70 highlights the field of the load item that exceeds the threshold value preset by the user regarding such load item regarding each path, and the number of such highlighted load items is displayed as an overload level in the corresponding "overload level" field of the "path neck factor" field.

Similarly, among the respective load items of load factor of the logical volume VOL and load factor of the RAID group 32, the load statistics information display screen 70 highlights the field of the load item that exceeds the threshold value preset by the user regarding such load item regarding each path, and the number of such highlighted load items is displayed as an overload level in the corresponding "overload level" field of the "path neck factor" field.

Thus, the user is able to confirm the statistical loaded condition of the respective paths within the range of the sampling time set with the sampling time setting screen 65 based on the load statistics information display screen 70. By clicking the OK button 71 displayed at the lower right of the load statistics information display screen 70, the user is able to close the load statistics information display screen 70 and return to the foregoing setting policy display screen 60 (FIG. 5).

Figure 8:
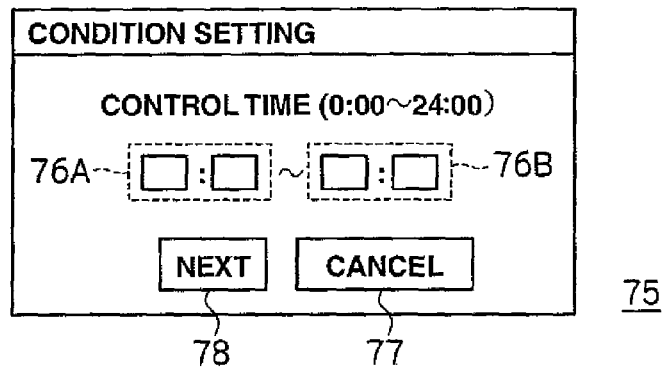
FIG. 8 is a schematic diagram showing the time condition setting screen.

Meanwhile, by clicking the policy creation/change button 63 (FIG. 5) of the setting policy display screen 60, the user is able to display a time condition setting screen 8 as shown in FIG. 8 on the display of the management server 3.

The time condition setting screen 75 is a screen for setting or changing the time range to which the newly created or existing policy is to be applied (this is hereinafter referred to as the "control time"). The time condition setting screen 75 can be used to input the start time and the finish time of the control time, and the input start time and finish time are respectively displayed on the control start time display unit 76A and the control finish time display unit 76B.

The time condition setting screen 75 is provided with a next button 77 and a cancel button 78 at the lower part of the screen. By clicking the next button 77, the user is able to display the item condition setting screen 80 shown in FIG. 9 on the display of the management server 3, and, by clicking the cancel button 78, the user is able to close the time condition setting screen 75 and return to the setting policy display screen 60.

The item condition setting screen 80 is a screen for setting the threshold value of the respective load items regarding a newly created policy or a policy in which the setting thereof is to be changed. With this item condition setting screen 80, by clicking the pulldown menu display button 82 provided to the right side of the load item name display column 81, it is possible to display the pulldown menu 83 indicating certain load item names to which control conditions can be set, and, by selecting the load item name of the desired load item among the load items displayed on the pulldown menu 83, it is possible to display the load item name on the load item name display column 81.

With the item condition setting screen 80, it is possible to input a desired threshold value with a keyboard or the like regarding the load item with the load item name displayed on the load item name display column 81, and the input threshold value is displayed in the threshold value display column 84 provided to the right side of the load item name display column 81.

With the item condition setting screen 80, by clicking the pulldown menu display button 86 displayed at the right side of the threshold value display column 84, it is possible to display the pulldown menu 87 indicating the options of applicable conditions such as "Less", "Same" and "More", and, by selecting a desired applicable condition among the applicable conditions displayed on the pulldown menu 87, it is possible to display such applicable condition on the applicable condition display column 85.

Thus, the user is able to use the item condition setting screen 80 and designate the threshold value and applicable conditions ("Less", "Same" or "More") as the control condition regarding the respective load items to which the control conditions can be set.

With the item condition setting screen 80, by clicking the OK button 88 provided to the lower part of the screen after respectively designating the desired threshold value and the applicable conditions regarding each of the corresponding load items, it is possible to reflect these designations in the current policy setting. At such time, it is possible to return from the item condition setting screen 80 to the setting policy display screen 60 (60).

Contrarily, with the item condition setting screen 80, it is possible to return to the time condition setting screen 75 by clicking the return button 89 provided on the right side of the OK button 88, and it is possible to return to the setting policy display screen 60 without reflecting the contents displayed on the threshold value display column 84 and the applicable condition display column 85 on the current policy setting by clicking the cancel button 90 provided to the right side of the return button 89.

Figure 10:
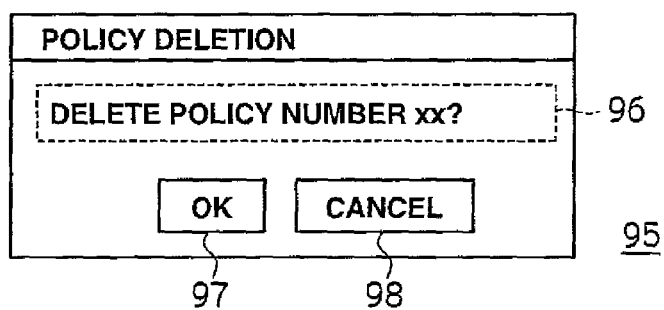
FIG. 10 is a schematic diagram showing the deletion confirmation screen.

Meanwhile, by clicking the delete button 64 (FIG. 5) after selecting one policy among the policies displayed on the setting policy display screen 60, the user is able to display the deletion confirmation screen 95 shown in FIG. 10 on the display of the management server 3.

The deletion confirmation screen 95 is a screen for the user to confirm whether it is in fact all right to delete the policy selected in the setting policy display screen 60 by clicking the delete button 64 (FIG. 5), and a message 96 ("Do you really want to delete policy number xx?") asking whether it is okay to delete the policy number of the policy to be deleted, an OK button 97, and a cancel button 98 are displayed at such time.

With the deletion confirmation screen 95, by clicking the OK button 97, it is possible to return to the setting policy display screen 60 upon deleting the policy setting to be deleted at such time, and, by clicking the cancel button 98, it is possible to return to the setting policy display screen 60 without deleting the policy to be deleted at such time.

(2-4-2) Processing Contents of CPU in Policy Display Setting Processing

Figure 11:
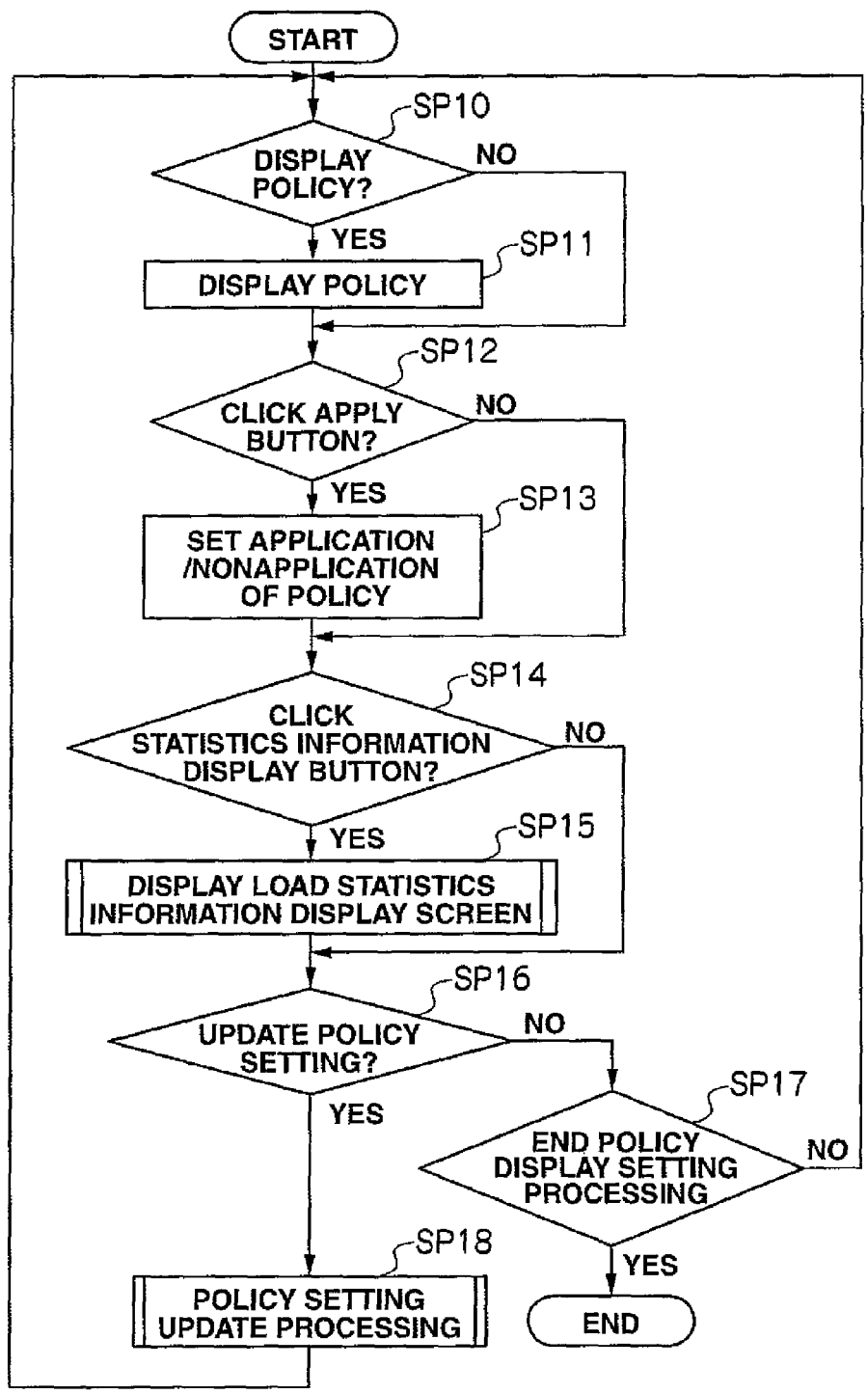
FIG. 11 is a flowchart showing the processing routine of policy display setting processing.

FIG. 11 is a flowchart showing the processing contents of the CPU 20 of the management server 3 to be performed at step SP4 of the policy path management processing (FIG. 2) described above.

When the CPU 20 proceeds to step SP4 of the policy path management processing (FIG. 2), it starts the policy display setting processing shown in FIG. 11, and foremost determines whether to display the setting policy display screen 60 (FIG. 5) explained with reference to FIG. 5 (SP10). Incidentally, in the initial state when the policy display setting processing is started, the determination at this step SP10 is omitted.

The CPU 20 proceeds to step SP12 upon obtaining a negative result in this determination, and displays the setting policy display screen 60 on the display of the management server 3 upon obtaining a positive result (SP11).

The CPU 20 thereafter determines whether the apply button 61 of the setting policy display screen 60 has been clicked (SP12). The CPU 20 proceeds to step SP14 upon obtaining a negative result in this determination, and, upon obtaining a positive result, sets "nonapplicable" when the policy set on the setting policy display screen 60 was set as being applicable at the stage when the apply button 61 was clicked, and sets "applicable" when the policy was set as being nonapplicable (SP13).

Subsequently, the CPU 20 determines whether the statistics information display button 62 of the setting policy display screen 60 has been clicked (SP14). The CPU 20 proceeds to step SP16 upon obtaining a negative result in this determination, and executes processing for displaying the load statistics information display screen 15 explained with reference to FIG. 7 on the display of the management server 3 (this is hereinafter referred to as "load statistics information display processing") upon obtaining a positive result (SP15).

The CPU 20 thereafter determines whether the policy creation/change button 63 or the delete button 64 of the setting policy display screen 60 has been clicked (SP16). When the CPU 20 obtains a negative result in this determination, it determines whether an operation for ending this policy display setting processing has been input (SP17).

The CPU 20 ends this policy display setting processing upon obtaining a positive result in this determination. Contrarily, the CPU 20 returns to step SP10 upon obtaining a negative result in the determination at step SP 17, and thereafter repeats these processing steps (SP10 to SP17) until it obtains a positive result in the determination at step SP16 or step SP17.

Figure 9:
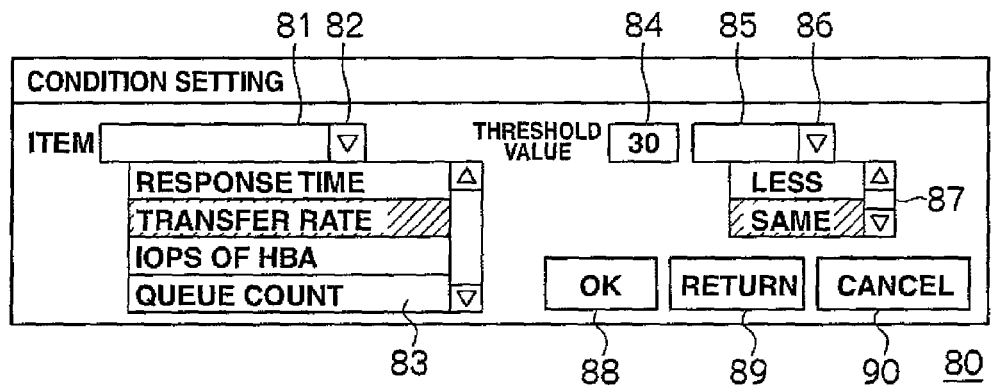
FIG. 9 is a schematic diagram showing the item condition setting screen.

Meanwhile, when the CPU 20 eventually obtains a positive result in the determination at step SP16, it displays the necessary screen among the time condition setting screen 75 explained with reference to FIG. 8, the item condition setting screen 80 explained with reference to FIG. 9, and the deletion confirmation screen 95 explained with reference to FIG. 10 on the display of the management server. Further, the CPU 20 executes processing for changing the current policy setting according to the user's operation input using these screens (this is hereinafter referred to as "policy setting change processing") (SP18).

The CPU 20 returns to step SP10 upon completing this policy setting change processing, and thereafter repeats similar processing steps (SP10 to SP18).

(2-4-3) Load Statistics Information Display Processing

Figure 12:
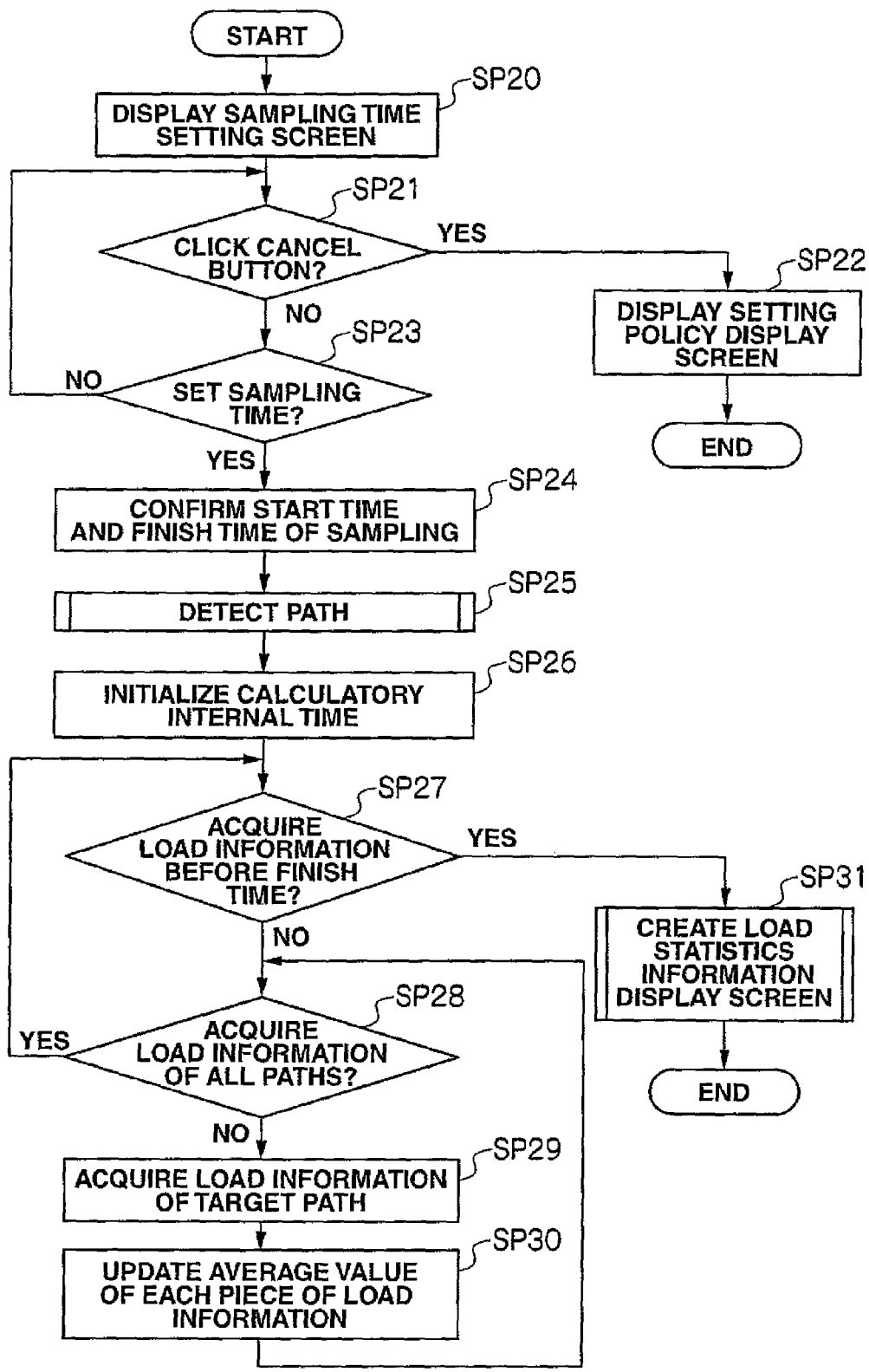
FIG. 12 is a flowchart showing the processing routine of load statistics information display processing.

FIG. 12 is a flowchart showing the specific processing contents of the CPU 20 to be performed at step SP15 of the policy display setting processing (FIG. 11).

When the CPU 20 proceeds to step SP15 of the policy display setting processing (FIG. 11), it starts the load statistics information display processing, and foremost displays the sampling time setting screen 65 explained with reference to FIG. 6 on the display of the management server 3 (SP20), and thereafter determines whether the cancel button 68 on the sampling time setting screen 65 has been clicked (SP21).

When the CPU 20 obtains a positive result in this determination, it closes the sampling time setting screen 65 and displays the setting policy display screen 60 on the display of the management server 3 (SP22), and thereafter ends this load statistics information display processing.

Contrarily, when the CPU 20 obtains a negative result in the determination at step SP21, it determines whether the OK button 67 of the sampling time setting screen 65 has been clicked after the start time and finish time of the sampling time have been set (SP23).

The CPU 20 returns to step SP21 upon obtaining a negative result in this determination, and thereafter repeats the determination of step SP21 and step SP22 until it obtains a negative result at step SP21 or a positive result at step. SP22.

When the CPU 20 eventually obtains a positive result in the determination at step SP23, it confirms the start time and finish time of the sampling time set at such time (SP24), and thereafter detects all paths from the respective host systems 2 existing in the storage system 1 to the logical volume VOL of the storage apparatus 5 (SP25).

Subsequently, the CPU 20 sets the calculatory internal time to be referred to upon performing the processing of step SP27 to step SP31 described later as the start time of the sampling time confirmed at step SP24 (SP26), and thereafter determines whether statistics information of each time frame up to the finish time of the sampling time has been acquired (SP27). When the CPU 20 obtains a negative result in this determination, it determines whether the acquisition of information of the respective load items regarding all paths detected at step SP25 is complete (SP28).

When the CPU 20 obtains a negative result in this determination, it selects one path among the paths detected at step SP25 as the target path, and reads the average value of the respective load items of the time frame with the calculatory internal time as the start time among the load information of the selected path from the "average value" field 51C of the statistical table 51 explained with reference to FIG. 4B (SP29). For instance, when the sampling time is set to "6:00" to "12:00", the CPU 20 will, at this step SP29, read all statistics such as the response time of path, data transfer rate and data I/O count per second of the host bust adapter from the statistical table 51 as the target at such time in a time frame (for example "6:00" to "6:10" or "6:10" to "6:20") in which the calculatory internal time is the start time.

Subsequently, the CPU 20 calculates, for each load item, the average value of statistics in each time frame of the current target path that was read from the statistical table 51 theretofore (SP30). For example, in a case where the statistics have been read in the respective time frames of "6:00" to "6:10" and "6:10" to "6:20" theretofore regarding the current target path, and the statistics of the response time of the time frame of "6:00" to "6:10" is "30", and the statistics of the response time of the time frame of "6:10" to "6:20" is "40", the CPU 20 will calculate the average value of "30" and "40" regarding the response time.

The CPU 20 thereafter repeats similar processing steps (SP28 to SP30) while sequentially changing the target path to other paths, and, when it eventually completes calculating the average value of statistics of the respective loaded items in the same time frame regarding all paths (SP28: YES), it returns to step SP27 after advancing the calculatory internal time for the amount of unit time, and thereafter repeats similar processing steps (SP27 to SP30) after moving the time frame to the subsequent time frame.

When the CPU 20 eventually completes the similar processing steps regarding all time frames up to the finish time of the sampling time set by the user (SP27: YES), it generates the load statistics information display screen 70 explained with reference to FIG. 7 based on the processing result, and displays the generated load statistics information display screen 70 on the display of the management server 3 (SP31). The CPU 20 thereafter ends this load statistics information display processing.

Figure 13:
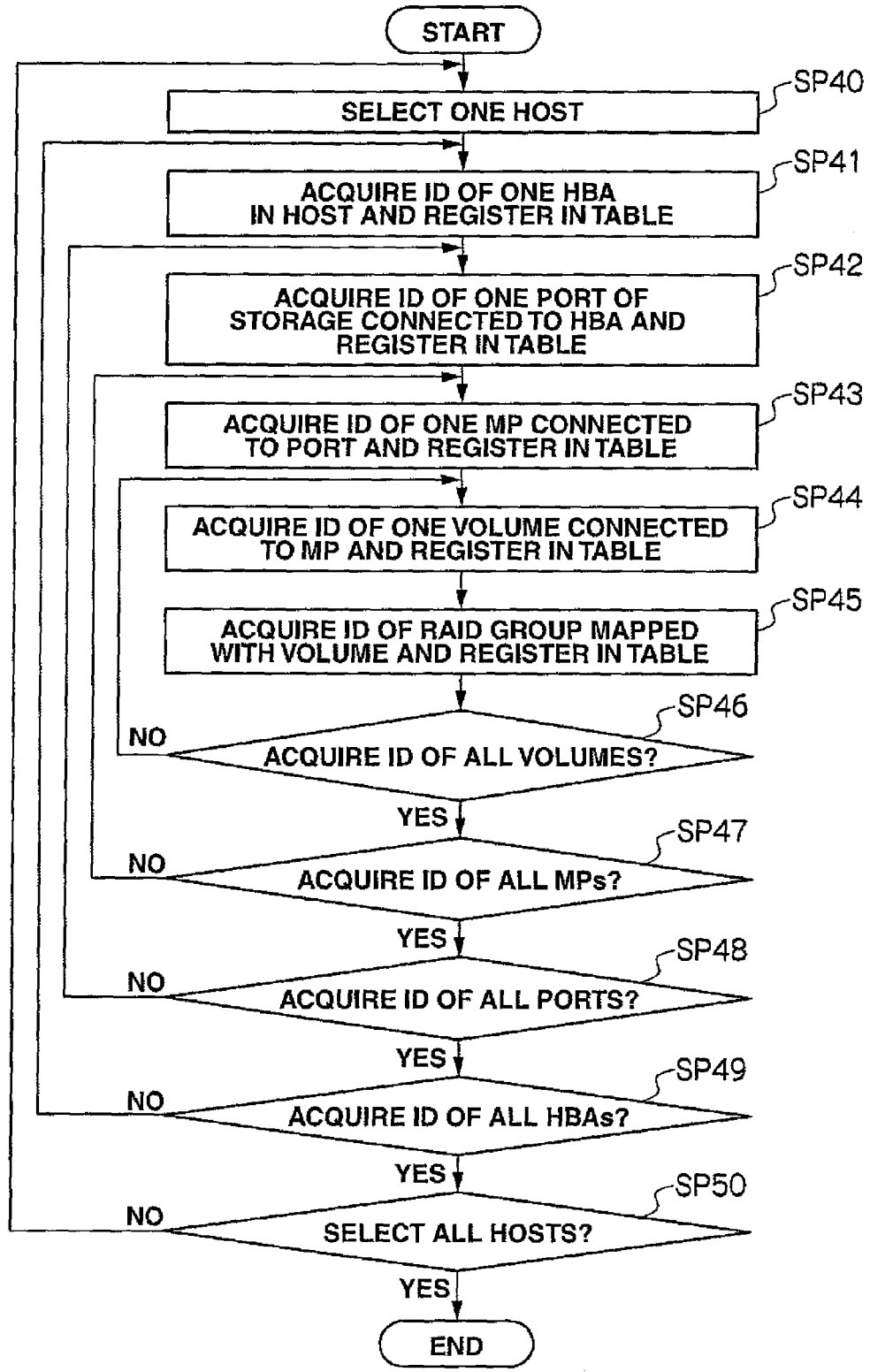
FIG. 13 is a flowchart showing the processing routine of path detection processing.

Incidentally, FIG. 13 shows the specific processing contents of the CPU 20 relating to the detection processing of a specific path at step SP25 of the load statistics information display processing (FIG. 12).

When the CPU 20 proceeds to step SP25 of the load statistics information display processing (FIG. 12), it foremost selects one host system 2 among the host systems existing in the storage system 1 (SP40). The CPU 20 accesses this host system 2 and acquires the host bus adapter ID of one host bus adapter 12 among the host bus adapters 12 (FIG. 1) connected to the network 4 (FIG. 1). The CPU 20 thereafter stores the acquired host bus adapter ID in the "host bus adapter ID" field 110C of the path information table 110 shown in FIG. 14 (SP41).

Subsequently, the CPU 20 the accesses the storage apparatus 5, selects one port 40 among those connected via the network 4 to the host bus adapter 12 in which the host bus adapter ID was acquired at step SP41 among the ports 40 (FIG. 1) provided to the storage apparatus 5, and acquires such port ID. The CPU 20 thereafter stores the acquired port ID in the "port ID" field 110C of the path information table 110 (SP42).

Then, the CPU 20 accesses the storage apparatus 5, selects one channel processor 41 or disk management processor 43 connected to the acquired port 40 in which the port ID was acquired at step SP42 among the channel processors 41 and disk management processors 43 provided to the storage apparatus 5, and acquires the microprocessor ID of the internally existing microprocessor. The CPU 20 thereafter stores the acquired microprocessor ID in the "microprocessor ID" field 110D of the path information table 110 (SP43).

In addition, the CPU 20 thereafter accesses the storage apparatus 5, selects one logical volume VOL among the logical volumes VOL connected with the channel processor 41 or disk management processor 43 storing the microprocessor in which the microprocessor ID was acquired at step SP43 among the logical volumes VOL provided to the storage apparatus 5, and acquires the volume ID. The CPU 20 thereafter stores the acquired volume ID in the "volume ID" field 11E of the path information table 110 (SP44).

Moreover, the CPU accesses the storage apparatus 5, and acquires the RAID group ID of the RAID group 32 (FIG. 1) mapped with the logical volume VOL in which the volume ID was acquired at step SP44. The CPU 20 thereafter stores the acquired RAID group ID in the "RAID group ID" field 110F of the path information table 110 (SP45).

Subsequently, the CPU 20 determines whether the volume ID of all logical volumes VOL satisfying the conditions at step SP44 has been acquired among the logical volumes VOL existing in the storage apparatus 5 (SP46), and returns to step SP44 upon obtaining a negative result. The CPU 20 thereafter repeats the processing at step SP44 to step SP46 until it obtains a positive result at step SP46.

When the CPU 20 obtains a positive result in the determination at step SP46, it determines whether the microprocessor ID of all microprocessors satisfying the conditions at step SP43 among the microprocessors respectively provided to all channel processors 41 and all disk management processors 43 existing in the storage apparatus 5 has been acquired (SP47), and returns to step SP43 upon obtaining a negative result. The CPU 20 thereafter repeats the processing at step SP43 to step SP47 until it obtains a positive result at step SP47.

When the CPU 20 obtains a positive result in the determination at step SP47, it determines whether the port ID of all ports 40 satisfying the conditions at step SP42 among all ports 40 existing in the storage apparatus 5 has been acquired (SP48), and returns to step SP42 upon obtaining a negative result. The CPU 20 thereafter repeats the processing at step SP42 to step SP48 until it obtains a positive result at step SP48.

Subsequently, when the CPU 20 obtains a positive result in the determination at step SP48, it determines whether the host bus adapter ID of all host bus adapters 12 satisfying the conditions at step SP41 among all host bus adapters 12 (FIG. 1) existing in the host system 2 has been acquired (SP49), and returns to step SP41 upon obtaining a negative result. The CPU 20 thereafter repeats the processing at step SP41 to step SP49 until it obtains a positive result at step SP49.

When the CPU 20 obtains a positive result in the determination at step SP49, it determines whether the selection of all host systems 2 existing in the storage system 1 is complete (SP50), and returns to step SP40 upon obtaining a negative result. The CPU 20 thereafter repeats the processing at step SP40 to step SP50 until it obtains a positive result at step SP50.

When the CPU 20 eventually obtains a positive result in the determination at step SP50, it ends this path detection processing, and thereafter returns to the load statistics information display processing (FIG. 12).

Figure 15:
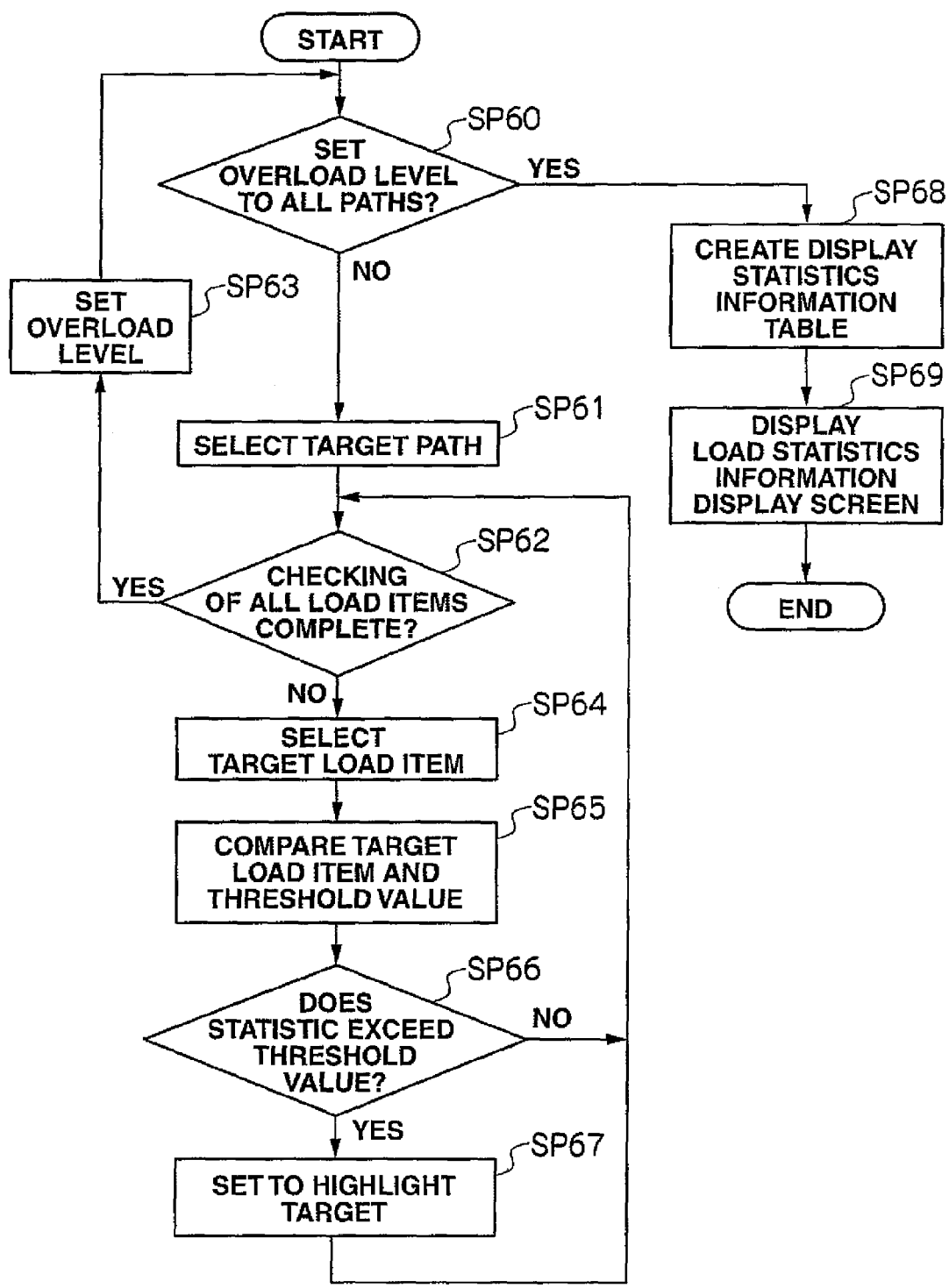
FIG. 15 is a flowchart showing the processing routine of load statistics information display screen display processing.

Meanwhile, FIG. 15 is a flowchart showing the specific processing contents of the CPU 20 relating to the load statistics information display processing at step SP31 of the load statistics information display processing (FIG. 12).

When the CPU 20 proceeds to step SP31 of the load statistics information display processing, it starts this load statistics information display screen display processing, and foremost determines whether the detection of the overload level explained with reference to FIG. 7 is complete regarding all paths detected at step SP25 of the load statistics information display processing (SP60).

When the CPU 20 obtains a negative result in this determination, it selects one path among the paths detected at step SP 25 of the load statistics information display processing as the target path (SP61), and thereafter determines whether the processing at step SP64 to step SP67 described later relating to the path has been performed regarding all load items (SP62).

When the CPU 20 obtains a negative result in this determination, it selects one load item as the target load item (SP62), and thereafter compares the statistics of the target load time of the current target path and the threshold value preset by the user regarding the target load item (SP65).

The CPU 20 returns to step SP62 upon obtaining a negative result in this determination, and, upon obtaining a positive result, it sets the current target load item of the current target path as a highlighting target (SP66), and thereafter returns to step SP62. The CPU 20 thereafter repeats similar processing steps (SP62 to SP67) while sequentially switching the load item selected at step SP61 to other load items.

When the CPU 20 eventually obtains a positive result at step SP62 as a result of the comparison processing with the threshold value regarding all load items of the target path being complete, it sets the number of corresponding load items set to be highlighted regarding the target path in the overload level of the target path (SP63), and thereafter returns to step SP60.

Subsequently, the CPU 20 repeats similar processing steps (SP60 to SP67) while sequentially switching the path selected as the target path at step SP61 to other paths. When the CPU 20 eventually completes the similar processing regarding all paths detected at step SP25 of the load statistics information display processing, it thereafter creates the display statistics information table 10 shown in FIG. 16 based on the processing result at step SP27 to step SP30 of the load statistics information display processing (FIG. 12) and the processing result of the load statistics information display screen display processing (FIG. 15) (SP68).

The display statistics information table 100 is a table summarizing the statistics regarding the respective load items in the sampling time set by the user in the respective paths acquired at step SP23 of the load statistics information display processing (FIG. 12), and, as evident from FIG. 13, is configured from a "path ID" field 100A, a "path neck factor" field 100B, and a "drive neck information" field 100C.

Among the above, the "path ID" field 100A stores the identification number of the corresponding path as the path ID.

The "path neck factor" field 100B is configured from a "response time" field 100BA, a "transfer rate" field 100BB, an "HBA data I/O PS" field 100BC, a "queue count" field 100BD, a "path utilization ratio" field 100BE, an "MP availability factor" field 100BF, and an "overload level" field 100BG.

The "response time" field 100BA, "transfer rate" field 100BB, "HBA data I/O PS" field 100BC, "queue count" field 100BD, "path utilization ratio" field 100BE and "MP availability factor" field 100BF store, as statistics, the statistical average value within the sampling time designated by the user regarding the response time of the path acquired with the processing at step SP27 to step SP30 of the load statistics information display processing (FIG. 12), a data transfer rate of such path, a data I/O processing count per second of the host bus adapter 12 through which the path passes through, queue count upon the corresponding host system 2 performing queue processing, utilization ratio of the path or the availability factor of processors in the channel processors 41 and the disk management processors 43 of the storage apparatus 5 through which the path passes through.

The "drive neck information" field 100C is configured from a "volume load factor" field 100CA, a "RAID group load factor" field 100CB and an "overload level" field 100CC.

The "volume load factor" field 100CA and the "RAID group load factor" field 100CB store, as statistics, the statistical average value within the sampling time designated by the user regarding the load factor of the logical volume VOL connected to the path acquires in the processing at step SP27 to step SP30 of the load statistics information display processing (FIG. 12), and the load factor of the RAID group 32 (FIG. 1) mapped with the logical volume VOL.

Accordingly, in the example of FIG. 16, the response time of "path 1" within the sampling time of "6:00" to "12:00" designated as the sampling time by the user is "100", the data transfer rate is "100", and the data I/O count per second of the host bus adapter 12 through which the "path 1" passes through is "2000". . . , and the load factor of the logical volume VOL connected to the "path 1" within the sampling time is "5", and the load factor of the RAID group 32 mapped with the logical volume VOL is "10".

Meanwhile, the lowest row of the "response time" field 100BA, "transfer rate" field 100BB, "HBA data I/O PS" field 100BC, "queue count" field 100BD, "path utilization ratio" field 100BE, "MP availability factor" field 100BF, "volume load information" field 100CA, and "RAID group load information" field 100CB stores the threshold value preset by the user regarding the response time, the data transfer rate, the data I/0 processing count per second of the host bus adapter 12, the queue count, the path utilization ratio, the availability factor of the microprocessor, the load factor of the logical volume VOL, and the load factor of the RAID group 32.

The "overload level" field 100BG of the "path neck factor" field 100B and the "overload level" field 100CC of the "drive neck information" field 100C respectively store the overload level detected at step SP63 of the load statistics information display processing (FIG. 15).

For instance, in the example of FIG. 16, since "path 1" does not exceed the corresponding threshold value of the response time, the data transfer rate, the data I/O processing count per second of the host bus adapter 12, the queue count of the host system 2 connected to the path 1, the path utilization ratio of the path 1, and the availability factor of the corresponding microprocessor, "0" is stored in the corresponding "overload level" field 100BG in the "path neck factor" field 100B. Further, since "path 1" does not exceed the corresponding threshold value of the load factor of the logical volume VOL and the load factor of the RAID group 32 mapped with the logical volume VOL, "0" is stored in the corresponding "overload level" field 100CC in the "drive neck information" field 100C.

Contrarily, "path 2" is exceeding the corresponding threshold value (including the same value as the threshold value) of the response time, the data I/O processing count per second of the host bus adapter 12, the queue count of the host system 2 connected to the path 1, and the path utilization ratio of the path 1, "4" is stored in the corresponding "overload level" field 100BG in the "path neck factor" field 100B. Further, since "path 2" does not exceed the corresponding threshold value of the load factor of the logical volume VOL and the load factor of the RAID group 32 mapped with the logical volume VOL, "0" is stored in the corresponding "overload level" field 100CC in the "drive neck information" field 100C.

After the CPU 20 creates this kind of display statistics information table 100, it generates the load statistics information display screen 70 explained with reference to FIG. 7 based on the display statistics information table 100. Thereupon, the CPU 20 generates the load statistics information display screen 70 highlighting the field of the respective load items set to be highlighted based on the processing at step SP61 to step SP67 of the load statistics information display processing (FIG. 15).

Subsequently, the CPU 20 displays the load statistics information display screen 70 on the display of the management server 3 (SP69), and thereafter ends this load statistics information display screen display processing.

(2-4-4) Policy Setting Change Processing

Figure 17:
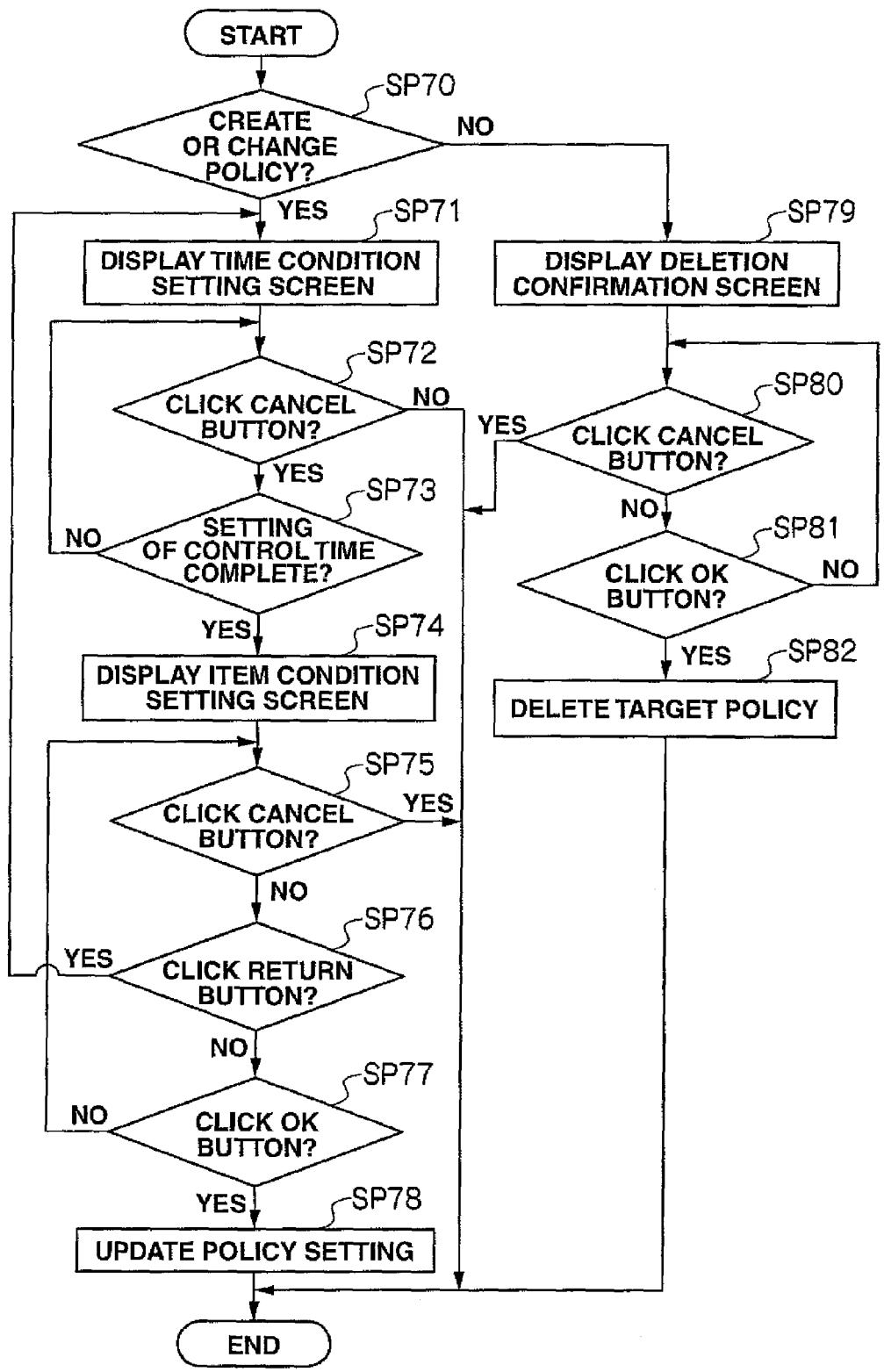
FIG. 17 is a flowchart showing the processing routine of policy setting change processing.

FIG. 17 is a flowchart showing the specific processing contents of the CPU 20 regarding the policy setting change processing at step SP 19 of the policy display setting processing explained with reference to FIG. 11.

When the CPU 20 proceeds to step SP19 of the policy display setting processing (FIG. 11), it starts the policy setting change processing, and foremost determines whether the button determined to be clicked at step SP16 of the policy display setting processing (FIG. 11) is the policy creation/change button 63 (FIG. 6) of the setting policy display screen 60 (FIG. 6) (SP70).

When the CPU 20 obtains a positive result in this determination, it displays the time condition setting screen 75 explained with reference to FIG. 8 on the display of the management server 3 (SP71), and thereafter determines whether the cancel button 77 (FIG. 0 of the time condition setting screen 75 has been clicked (SP72).

When the CPU 20 obtains a negative result in this determination, it determines whether the next button 78 of the time condition setting screen 75 was clicked in a state where the start time and finish time of the control time were input (SP73). The CPU 20 returns to step SP71 upon obtaining a negative result in this determination, and thereafter waits to obtain a positive result at step SP72 or step SP73.

When the CPU 20 eventually obtains a positive result in the determination at step SP72, it ends this policy setting change processing, and, contrarily, when the CPU 20 eventually obtains a positive result at step SP73, it displays the item condition setting screen 80 explained with reference to FIG. 9 on the display of the management server 3.

The CPU 20 thereafter sequentially determines whether the cancel button 90 (FIG. 9) of the item condition setting screen 80 has been clicked (SP75), whether the return button 89 (FIG. 9) of the item condition setting screen 80 has been clicked (SP76), and whether the OK button 88 (FIG. 9) of the item condition setting screen 80 has been clicked (SP77), and waits to obtain a positive result in any of the foregoing determinations.

When the CPU 20 eventually obtains a positive result in the determination at step SP75, it ends this policy setting change processing, and returns to step SP71 upon obtaining a positive result in the determination at step SP76.

When the CPU 20 obtains a positive result in the determination at step SP77, if the user created a new policy using the item condition setting screen 80, it stores the setting information of the new policy as setting policy information 24 (FIG. 1) in the memory 21 (FIG. 1). Contrarily, when the user changed the setting of an existing policy with the item condition setting screen 80, the CPU 20 changes the setting of the policy stored in the memory 21 as the setting policy information 24 according to the user's setting (SP78). The CPU 20 thereafter ends this policy setting change processing.

Meanwhile, to obtain a negative result in the determination at step SP70 means that the delete button 64 (FIG. 5) of the setting policy display screen 60 (FIG. 5) has been clicked. Thus, the CPU 20 displays the deletion confirmation screen 95 explained with reference to FIG. 10 on the display of the management server 3 (SP79).

The CPU 20 thereafter sequentially determines whether the cancel button 98 of the deletion confirmation screen 95 has been clicked (SP80), and whether the OK button 97 of the deletion confirmation screen 95 has been clicked (SP81), and waits to obtain a positive in any of the foregoing determinations.

When the CPU 20 thereafter obtains a positive result in the determination at step SP80, it ends this policy setting change processing. Contrarily, when the CPU 20 obtains a positive result in the determination at step SP81, it deletes the setting information of the target policy from the setting policy information 24 (FIG. 1) (SP82), and thereafter ends this policy setting change processing.

(2-5) Policy Path Switching Control Setting Processing (SP5)

Figure 18:
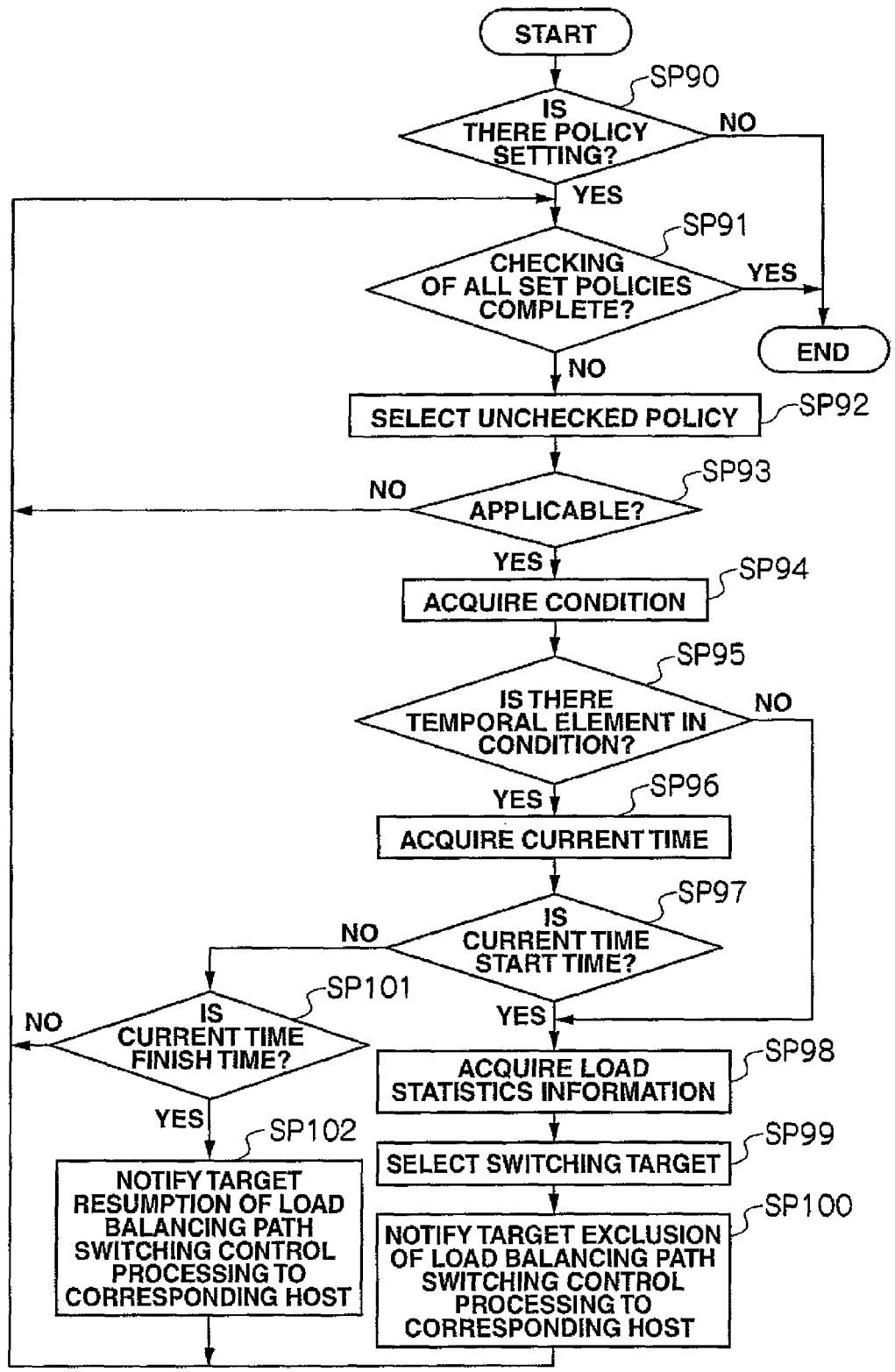
FIG. 18 is a flowchart showing the processing routine of policy path switching control processing.

Meanwhile, the CPU 20 executes the policy path switching control setting processing according to the flowchart shown in FIG. 18 at step SP5 of the policy path management processing explained with reference to FIG. 2.

In other words, when the CPU 20 proceeds to step SP5 of the policy path management processing, it starts this policy path switching control setting processing, and foremost determines whether there is a policy that is current set based on the setting policy information 24 stored in the memory 21 of the management server 3 (SP90).

When the CPU 20 obtains a negative result in this determination, it ends this policy path switching control setting processing and returns to step SP1 of the policy path management processing (FIG. 2). Contrarily, when the CPU 20 obtains a positive result in this determination, it determines whether the checking process at step SP92 to step SP102 described later is complete regarding all set policies (SP91).

When the CPU 20 obtains a positive result in this determination, it ends this policy path switching control setting processing and returns to step SP1 of the policy path management processing (FIG. 2). Contrarily, when the CPU 20 obtains a negative result in this determination, it selects one policy among all set policies (SP92), and determines whether the setting of applicable/nonapplicable has been applied to the policy (SP93).

The CPU 20 returns to step SP90 upon obtaining a negative result in this determination. Contrarily, when the CPU 20 obtains a positive result in this determination, it acquires the control condition of such policy from the setting policy information 24 (SP94), and thereafter determines whether there is a time element as the control condition of such policy; that is, whether the control time has been set (SP95).

The CPU 20 proceeds to step SP98 upon obtaining a negative result in this determination, and contrarily acquires the current time from the internal timer not shown upon obtaining a positive result (SP96). The CPU 20 thereafter determines whether the current time coincides with the start time of the target policy (SP97).

When the CPU 20 obtains a positive result in this determination, it reads the load statistics information 23 from the memory 21 of the management server 3, and selects one path that satisfies the control condition of the policy set by the user as the switching destination of the target path based on the load statistics information 23 (SP99).

The CPU 20 thereafter notifies the corresponding host system 2 of a command to exclude the path selected at step SP99 from the target of load balancing path switching control processing for performing path switching control so as to balance the load of the path (SP100). Like this, the CPU 20 controls the host system 2 so as to exclude the path from the target of load balancing path switching control processing, and thereafter returns to step SP91. Incidentally, the CPU 10 of the host system 2 that received such notice will execute the load balancing path switching control processing for equalizing the load of paths other than the path excluded from the target.

Meanwhile, when the CPU 20 obtains a negative result in the determination at step SP97, it determines whether the current time coincides with the finish time of the target policy (SP101).

The CPU 20 returns to step SP91 upon obtaining a negative result in this determination. Contrarily, when the CPU 20 obtains a positive result in this determination, it notifies the corresponding host system 2 of a command to return the target path to the target of load balancing path switching control processing (SP102). Like this, the CPU 20 controls the host system 2 so as to return the path to the target of load balancing path switching control processing, and thereafter returns to step SP91.

(3) Effect of Present Embodiment

With the storage system 1 according to the present embodiment described above, it is possible to ensure the processing performance demanded by a user as a result of performing policy path switching control processing according to a policy created by the user as needed while seeking to improve the access performance from the host system 2 to the storage apparatus 5 based on the load balancing path switching control processing for dynamically switching the path to be used by the host system 2 according to the loaded condition of the respective paths between the host system 2 and the storage apparatus 5.

Accordingly, with the storage system 1, since it is possible to manage the path while giving consideration to the importance of processing, it is possible to ensure the processing performance demanded by the user while seeking to improve the access performance from the host system 2 to the storage apparatus 5.

Further, since the storage system 1 is able to perform policy path switching control processing according to a policy created by the user, no path switching will occur during that time and, as a result, it is possible to effectively prevent the generation of overhead of the host system 2 regarding the path switching processing.

(4) Other Embodiments

Incidentally, with the embodiment described above, although a case was explained where the path switching unit to execute the path switching control of dynamically switching the path to be used by the host system according to the loaded condition of the respective paths between the host system 2 and the storage apparatus 5 is configured from the CPU 10 governing the overall operational control of the host system 2, and the path management program 13, the present invention is not limited thereto, and various other configurations may be widely employed as the configuration of such path switching unit.

Further, in the foregoing embodiment, although a case was explained where the management unit for controlling the path switching unit to select a path according to the policy created by the user as needed, and exclude the selected path from the target of load balancing switching control processing to be performed by the host system 2 is configured with the management server 3 provided separately from the host system 2, the present invention is not limited thereto, and, for instance, the host system 2 may be equipped with this kind of function of the management server 3 (the host system may be loaded with the policy management program 22 and the like).

Moreover, in the foregoing embodiment, although a case was explained where the information explained with reference to FIG. 3 is employed as the load information to be extracted by the management server 3 from the host system 2 or the management terminal 6, the present invention is not limited thereto, and other information capable of recognizing the loaded condition of the respective paths may be provided additionally or in substitute for such information.

In addition, in the foregoing embodiment, although a case was explained where the present invention is applied to a storage system configured as illustrated in FIG. 1, the present invention is not limited thereto, and may be widely applied to various other types of storage systems.

The present invention may be widely applied to storage systems of various configurations in which a host system and a storage apparatus are connected via a plurality of paths.

What we claim is:

1. A storage system in which a host system includes a higher-level device and a storage apparatus providing a volume to said host system for reading and writing data are connected to each other via a plurality of paths, comprising:

a path switching unit provided to said host system and executing path switching control for dynamically switching paths among said plurality of paths to be used by said host system according to a first policy, said first policy being that loads of a plurality of first paths connecting said host system to said volume become equal to each other; and a management unit for presenting information which relates each of said plurality of first paths to a condition of said each of said plurality of first paths on a display of said management unit, a second policy being set through said display by a user, said second policy being that at least one second path included in said plurality of first paths is excluded from being a target of said path switching control for dynamically switching the paths to be used by said host system, said management unit controlling said path switching unit to execute said path switching control based on said first policy and said second policy.

2. The storage system according to claim 1, wherein said second policy is selected among a plurality of policies each of which is used for excluding said at least one second path included in said a plurality of first paths from being the target of said path switching control for dynamically switching the path based on each policy.

3. The storage system according to claim 2, wherein said management unit extracts, from said host system and said storage apparatus, load information per each of said plurality of first paths respectively representing the loaded condition of each of said plurality of first paths; generates load statistics information containing statistical results of said loaded condition per each of said paths based on each piece of extracted load information; and presents the generated load statistics information to a user as a rough standard upon said user creating said second policy.

4. The storage system according to claim 3, wherein said management unit presents said load statistics information to said user via said display, and highlights an item exceeding a predetermined threshold value among said load statistics information upon presenting said load statistics information to said user.

5. The storage system according to claim 2, wherein said management unit executes policy path switching control setting processing comprising the steps of:

(a) determining whether there is a policy setting;

(b) if there is a policy setting, determining whether checking of all said policies is complete;

(c) if the checking of all said policies is not complete, selecting an unchecked policy;

(d) determining if the unchecked policy has a setting of applicable/un-applicable applied to it;

(e) if the unchecked policy is not applicable, returning to step (b), (f) if the unchecked policy is applicable, acquiring a control condition of the unchecked policy and determining if there is a time element as a control condition of the policy;

(g) if there is a time element, acquiring a current time;

(h) determining if the current time is a start time, and if the current time is a start time, acquiring load statistics information, selecting a switching target and notifying target exclusion of a load balance and path switching control processing to a corresponding host; and
(i) if the current time is not a start time, determining whether it is a finish time, and, if the current time is a finish time, notifying target resumption with Load Balance Path Switching process to corresponding host.

6. The storage system according to claim 3, wherein said management unit presents said load statistics information to said user via said display, and displays an overload level representing the overloaded conditions per each of said paths upon presenting said load statistics information to said user.

* * * * *